US006874072B2

(12) United States Patent
Aasland (10) Patent No.: US 6,874,072 B2
(45) Date of Patent: Mar. 29, 2005

(54) METHOD, APPARATUS AND ARTICLE OF MANUFACTURE FOR MANAGING A REUSABLE LINEAR ACCESS STORAGE MEDIUM

(75) Inventor: Christian Aasland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 09/816,840

(22) Filed: Mar. 23, 2001

(65) Prior Publication Data

US 2002/0138693 A1 Sep. 26, 2002

(51) Int. Cl.[7] ............................................. G06F 12/12
(52) U.S. Cl. ...................................... 711/159; 711/111
(58) Field of Search .............................. 711/4, 111, 159, 711/170, 171, 206; 707/206

(56) References Cited

U.S. PATENT DOCUMENTS 5,689,707 A * 11/1997 Donnelly ..................... 707/206
5,765,175 A * 6/1998 Needham et al. ............ 707/206
5,893,120 A * 4/1999 Nemes ........................ 707/206
6,434,576 B1 * 8/2002 Garthwaite .................. 707/206

* cited by examiner

Primary Examiner—Gary Portka
(74) Attorney, Agent, or Firm—Moser, Patterson & Sheridan, LLP (57) ABSTRACT

A method, apparatus and article of manufacture for managing a reusable storage medium having a plurality of media blocks. A particular media block is included in a media set if the media block is used to store at least a portion of one linearly ordered data block. In one embodiment, an active window table is created to monitor the media blocks in the media set. If all data blocks stored in a particular media block have expired, then the media block is identified for further processing. The identified media blocks are removed from the active window table. A determination is made as to whether any identified media block is a reference media block that is an oldest media block in the media set. If the identified media block is the reference media block, the active window table is updated to indicate the reference media block as the oldest media block of the remaining media blocks in the active window table.

25 Claims, 9 Drawing Sheets

| DATA BLOCK SEQUENCE ←302 | MEDIA BLOCK IDENTIFIER ←304 | FIRST MEDIA BLOCK (BegMB) ←306 | MEDIA BLOCK SEQUENCE (MBSQ) ←308 | TOTAL MEDIA BLOCKS IN USE ←310 | EXPIRATION DATE ←312 |
|---|---|---|---|---|---|
| 1 | A | A | 1 | 9 | 1/1 |
| 2 | A | A | 1 | 9 | 1/15 |
| 3 | A | A | 1 | 9 | 1/31 |
| 3 | B | A | 2 | 9 | 1/31 |
| 3 | C | A | 3 | 9 | 1/31 |
| 3 | D | A | 4 | 9 | 1/31 |
| 4 | D | A | 4 | 9 | 2/15 |
| 5 | D | A | 4 | 9 | 2/28 |
| 5 | E | A | 5 | 9 | 2/28 |
| 5 | F | A | 6 | 9 | 2/28 |
| 5 | G | A | 7 | 9 | 2/28 |
| 6 | H | A | 8 | 9 | 3/15 |
| 7 | H | A | 8 | 9 | 3/15 |
| 8 | H | A | 8 | 9 | 4/1 |
| 9 | H | A | 8 | 9 | 4/15 |
| 10 | H | A | 9 | 9 | 4/31 |
| 10 | I | A | 9 | 9 | 4/31 |
| 11 | I | A | 9 | 9 | 5/1 |
| 12 | I | A | 9 | 9 | 5/15 |
| 13 | I | A | 9 | 9 | 6/1 |

| DATA BLOCK SEQUENCE (302) | MEDIA BLOCK IDENTIFIER (304) | FIRST MEDIA BLOCK (BegMB) (306) | MEDIA BLOCK SEQUENCE (MBSQ) (308) | TOTAL MEDIA BLOCKS IN USE (310) | EXPIRATION DATE (312) |
|---|---|---|---|---|---|
| 6 | 1 | 1 | 1 | 2 | 3/15 |
| 7 | 1 | 1 | 1 | 2 | 3/15 |
| 8 | 1 | 1 | 1 | 2 | 4/1 |
| 9 | 1 | 1 | 1 | 2 | 4/15 |
| 10 | 1 | 1 | 2 | 2 | 4/31 |
| 11 | 1 | 1 | 2 | 2 | 4/31 |
| 12 | 1 | 1 | 2 | 2 | 5/1 |
| 13 | 1 | 1 | 2 | 2 | 5/15 |

| DATA BLOCK SEQUENCE (302) | MEDIA BLOCK IDENTIFIER (304) | FIRST MEDIA BLOCK (BegMB) (306) | MEDIA BLOCK SEQUENCE (MBSQ) (308) | TOTAL MEDIA BLOCKS IN USE (310) | EXPIRATION DATE (312) |
|---|---|---|---|---|---|
| 10 | 1 | 1 | 1 | 2 | 4/31 |
| 10 | 1 | 1 | 2 | 2 | 4/31 |
| 11 | 1 | 1 | 2 | 2 | 5/1 |
| 12 | 1 | 1 | 2 | 2 | 5/15 |
| 13 | 1 | 1 | 2 | 2 | 6/1 |
| 14 | 1 | 1 | 2 | 2 | 7/1 |

METHOD, APPARATUS AND ARTICLE OF MANUFACTURE FOR MANAGING A REUSABLE LINEAR ACCESS STORAGE MEDIUM

BACKGROUND OF THE INVENTION

1. Field of the Invention

The invention relates to computers and computer memory. More particularly, the invention relates to a method, apparatus and article of manufacture for managing a reusable linear access storage medium.

2. Background of the Related Art

All computer systems store data on some type of storage medium having a finite storage capacity. The storage medium may be configured as a plurality of media blocks that are reusable. To facilitate the storage of data on such a limited capacity storage medium, an operating system assigns an "expiration date" to data blocks stored on the storage medium. A data block may comprise one data file, multiple data files or a portion of one data file. The use of expiration dates provides a measure of how long a particular data block is needed on the storage medium. The data block is considered active prior to the expiration date, but is considered expired after the expiration date.

The storage medium is classified as a random access medium or a linear (or sequential) access medium depending on how data blocks are accessed on the storage medium by a storage access device. In a random access medium, data block is directly accessible without the need to access any other data block. The random access medium, e.g., DVD-RAM (digital video disk random access memory), is generally limited to fixed size media blocks to enable data access. In contrast, a linear or sequential access medium may require access to other data blocks before an access of a particular data block. Linear access medium (or linear medium), e.g., magnetic tapes, may have variable size media blocks.

For linear access mediums, the operating system may track or monitor the different media blocks containing active data blocks within a media set, i.e., a plurality of media blocks, by using a "media header label" for each media block. The media header label contains information on the first media block of the media set and a media block sequence (MBSQ) number of the particular media block. The media block sequence number is indicative of a position of the media block in the media set. For example, the first media block used to store data blocks would have the lowest MBSQ number, while the last media block used to store data blocks would have the highest MBSQ number in the media set. Moreover, the operating system also assigns data block sequence numbers for data blocks, stored in each media set. These data block sequence numbers are indicative of the order in storing the data blocks in the media set.

Over time, some of these data blocks in the media set will become expired, i.e., the expiration date has passed for these data blocks. Although such expired data blocks are no longer used used by the computer system, the data blocks still occupy media blocks in the storage medium. As such, the operating system needs to remove the expired files such that these media blocks are reusable.

However, removing expired data blocks from the media set causes problems in tracking data blocks in the media set. For example, when a media block is initially used or reused for storage of data blocks, a media header label is appended to the media block. The media header label contains a reference to the "first media block" in the media set used to store data blocks. If this first media block no longer contains active data, the first media block is identified for removal from the media set. After removal of this first media block from the media set, the media header label for the remaining media blocks would reference a media block, i.e., the first media block, that is no longer part of the media set. As such, the media header label is no longer correctly referencing the first media block in the updated media set.

There are currently several possible approaches to resolve the problems associated with handling the media set in response to expired data blocks. One approach requires a user to manually remove media blocks that no longer contain any active data blocks, i.e., media blocks that only contain expired data blocks, from the media set. The removed media blocks are placed in a scratch pool of media blocks available for reuse or future storage. Although this approach allocates media blocks are for immediate reuse, a problem exists when a media block removed as the first media block of one media set is then reused as the first media block of another media set. This causes media blocks from two different media sets to reference the first media block, and corresponding confusion for the operating system. Moreover, if the first media block is removed and subsequently reused in the first media set, the media block would still be erroneously referenced, even though it no longer the oldest media block used to store the oldest data blocks.

A second approach stores new data blocks into a new media set. Media blocks in an existing media set are not affected or reused until all data blocks in that media set are expired. As such, this approach does not allocate media blocks for immediate reuse when that media block contains only expired data blocks. Moreover, if a last or last-added media block in the media set has not fully used its entire memory for storage, that unused memory is wasted. Thus, the approach fails to efficiently use all media blocks of a media set.

Thus, there is a need to provide accurate and efficient management of media blocks and associated media sets in a reusable linear access storage medium.

SUMMARY OF THE INVENTION

The invention provides a method, apparatus and article of manufacture for managing a reusable storage medium having a plurality of media blocks. A particular media block is included in a media set if the media block stores at least a portion of one linearly ordered data block. In one embodiment, an active window table is created to monitor the media blocks in the media set. If all data blocks stored in a particular media block have expired, then the media block is identified for further processing. The identified media blocks are removed from the active window table. A determination is made as to whether any identified media block is a reference media block that is an oldest media block in the media set. If the identified media block is the reference media block, the active window table is updated to indicate the reference media block as the oldest media block of the remaining media blocks in the active window table.

An apparatus comprising a memory and a processor is also provided. The apparatus is used with a storage medium comprising a plurality of media blocks, where a particular media block is included in a media set if the media block is used to store at least a portion of a data block. The memory stores a data backup program used with an operating system. The processor performs a method upon executing the data backup program and the operating system. Initially, an active window table is created to monitor the media blocks in the media set. If all data blocks stored in a particular media block have expired, then the media block is identified for further processing. The identified media blocks are removed from the active window table. A determination is made as to whether any identified media block is a reference media block that is an oldest media block in the media set. If the identified media block is the reference media block, the active window table is updated to indicate the reference media block as the oldest media block of the remaining media blocks in the active window table.

Additionally, a computer readable medium storing a software program is provided. The software program, when executed by a computer, causes the computer to perform a method. Initially, an active window table is created to monitor the media blocks in the media set. If all data blocks stored in a particular media block have expired, then the media block is identified for further processing. The identified media blocks are removed from the active window table. A determination is made as to whether any identified media block is a reference media block that is an oldest media block in the media set. If the identified media block is the reference media block, the active window table is updated to indicate the reference media block as the oldest media block of the remaining media blocks in the active window table.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
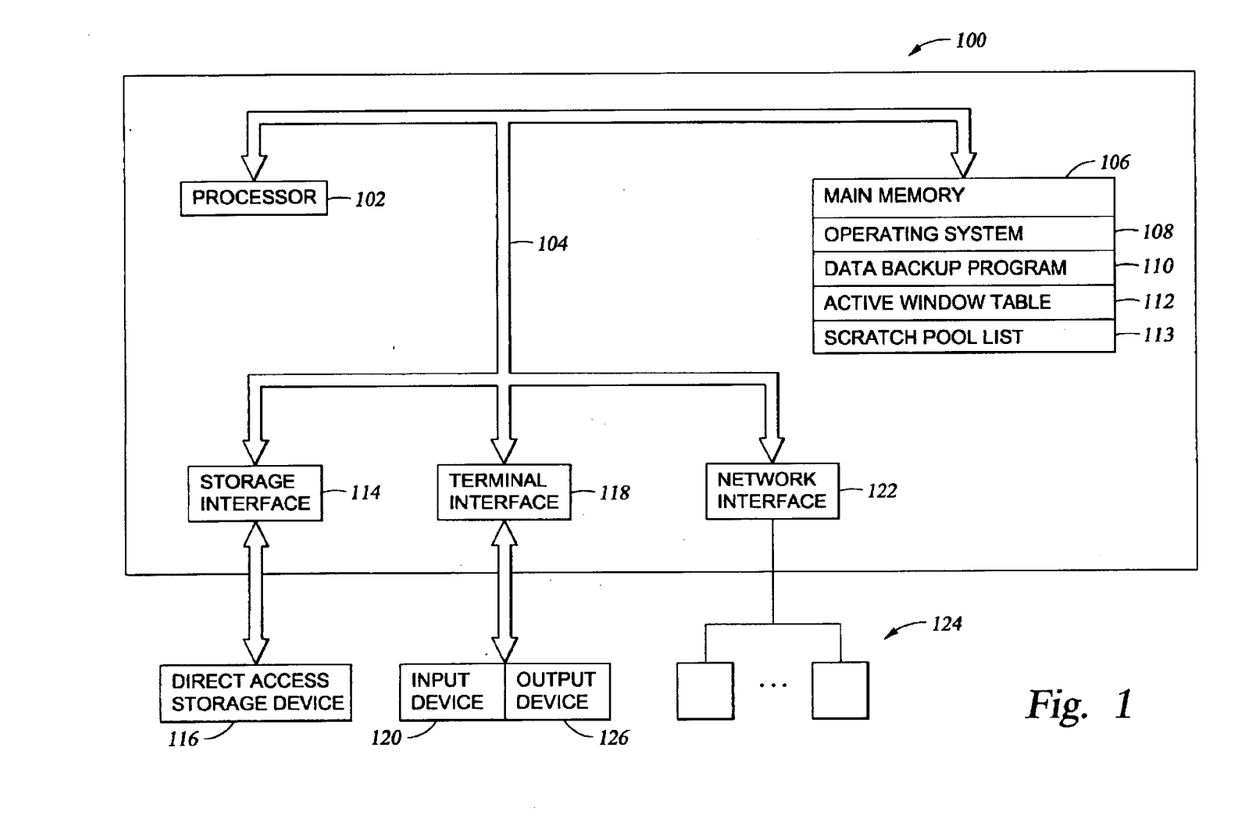
FIG. 1 depicts a block diagram of a computer system utilized to implement the present invention.

FIG. 1 depicts an illustrative computer system 100 utilized in accordance with the present invention. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an AS/400 available from International Business Machines of Armonk, N.Y.

The computer system 100 is shown in a multi-user programming environment having at least one processor 102, which obtains instructions and data from a main memory 106 via a bus 104. The main memory 106 includes an operating system 108 and at least one computer program, e.g., a data backup program 110. In addition, the main memory 106 may contain various data structures including an active window 112 and a scratch pool 113. The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. In one embodiment, the computer system 100 is illustratively coupled to a storage medium 116, input devices 120, output devices 126, and a plurality of networked devices 124. Each of these peripheral devices is operably coupled to the computer system 100 via respective interfaces. A storage interface 114 couples the computer system 100 to the storage medium 116. One example of the mass storage interface 114 is a disk drive. An input/output interface 118 couples the computer system 100 to the input devices 120 and output devices 126. Additionally, a network interface 122, e.g., a network interface card, couples the computer system 100 to the plurality of networked devices 124.

The storage medium 116 may comprise either a permanent or removable direct access storage device (DASD) of finite storage capacity. The storage medium 116 may be a nonvolatile or backup memory. In one embodiment, the storage medium 116 is configured as a plurality of media blocks that are either used, e.g., currently storing data, or unused. Each media block, also known as a "volume," is used to store data blocks or blocks of information associated with data files. The storage medium 116 in the present invention is a linear access medium. In a linear access medium, the storage interface 114, e.g., a disk drive or tape drive, may access other data blocks prior to accessing a particular data block. One example of the linear access medium 116 is a magnetic optical (MO) medium.

To maximize the utility of the finite storage capacity of the storage medium 116, the media blocks are reusable. Expiration dates are assigned to the data blocks by the operating system 108. The use of expiration dates identifies how long a data block is needed on the storage medium 116. As such, if a particular media block is only storing expired data blocks, that memory block may be reused to store additional data blocks. The storage of data blocks and reuse of media blocks is further described with respect to FIGS. 2A–2D.

The operating system 108 is the software utilized to operate the computer system 100. More specifically, the operating system 108 performs a variety of functions including coordinating the storage of data blocks in the storage medium 116 and using expiration dates tracking the stored data blocks. The operating system 108 uses the expiration dates with the active window 112 to coordinate the reuse of media blocks in the storage medium 116. One exemplary operating system 108 is the IBM AS/400. However, other operating systems 108 capable of using expiration dates to track data blocks are also applicable. Such operating systems 108 may include UNIX, IBM AIX, Microsoft Windows, and the like.

The data storage program 110 is a computer program that enables the operating system 108 to optimize the storage of data blocks in the storage medium 116. One embodiment of the data storage program 110 is a particular feature or option of the IBM BRMS/400 (BRMS: Backup Recovery Media Services). To optimize the storage of data blocks, the data storage program 110 uses an active window table 112 and a scratch pool list 113. In one embodiment, the program 110 maintains active window table 112 and the operating system 108 maintains the scratch pool list 113. The active window table 112 is a data structure for identifying data blocks that are currently active, i.e., not expired, and media blocks used to store active or unexpired data blocks. Operation of the active window table 112 is further described with respect to FIGS. 3A–3D. The scratch pool list 113 is a data structure for identifying media blocks that are available for storing data blocks. Such media blocks may include unused media blocks or previously used media blocks that contain expired data blocks.

The input devices 120 may comprise any device utilized to provide input to the computer system 100. Examples of input devices 120 include a keyboard, a keypad, a light pen, a touch screen, a button, a mouse, a track ball, a speech recognition unit, and the like. The output devices 126 may comprise any conventional display screen. Although shown separately from the input devices 120, the output devices 126 and input devices 120 could be combined. For example, a display screen with an integrated touch screen, and a display with an integrated keyboard, or a speech recognition unit combined with a text speech converter could be used.

In general, the routines executed to implement the embodiments of the invention, whether implemented as part of an operating system or a specific application, component, program, object, module or sequence of instructions will be referred to herein as the data backup program 110, or simply as the program 110. The program 110 typically comprises one or more instructions that are resident at various times in various memory and storage devices in the computer system 100. When read and executed by one or more processors 102 in the computer system 100, the program 110 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution. Examples of signal bearing or computer readable media include, but are not limited to, recordable type media such as volatile and nonvolatile memory devices, floppy and other removable disks, hard disk drives, optical disks (e.g., CD-ROM, DVD, and the like), among others. Examples of transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2A:
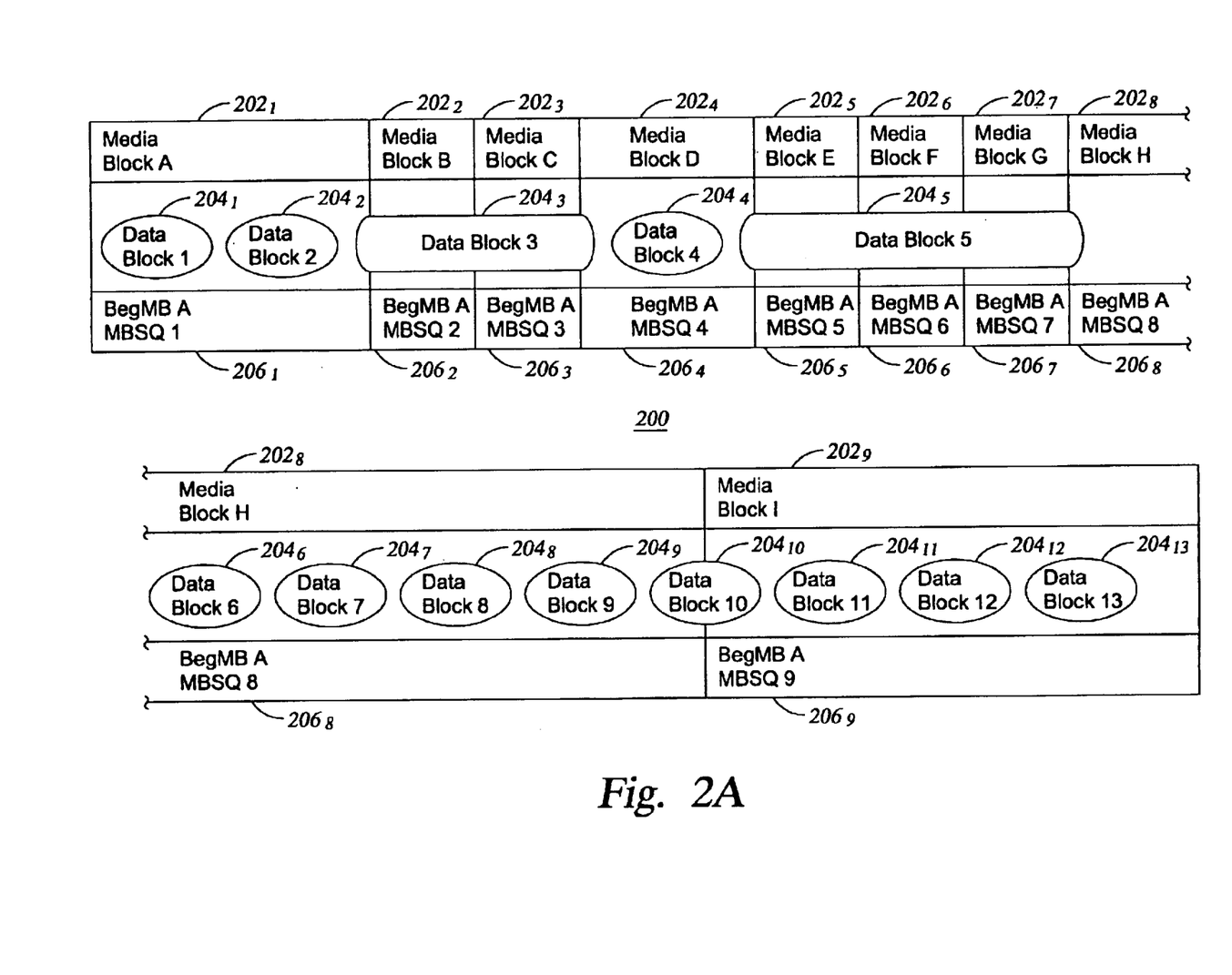
FIG. 2A illustrates the storage of data blocks in a media set having a plurality of media blocks in the storage medium.

FIG. 2A illustrates a plurality of media blocks $202_1$, $202_2, \ldots, 202_n$ (generally referred as $202_n$) used to store a plurality of data blocks $204_1, 204_2, \ldots, 204_m$ (generally referred as $204_m$). The number of media blocks $202_n$ (also known as volumes or storage blocks) is a finite number for a storage medium 116 of limited capacity. Illustratively, nine media blocks $202_1, 202_2, \ldots, 202_9$ are initially used to store thirteen linearly ordered data blocks $204_1, 204_2, \ldots, 204_{13}$. In one embodiment, the media blocks $202_n$ are assigned a media blocks sequence (MBSQ) identifier by the operating system 108. The media blocks $202_n$ are ordered in the order used to store data blocks $204_m$. For example, MBSQ 1 is the identifier for the first media block $202_1$, MBSQ 2 is the identifier for the second media block $202_2$ and MBSQ n is the identifier for the n-th media block $202_n$.

For a linear access medium, an access of a particular data block $204_m$ requires an access to previously stored data blocks $204_m$. As such, older data blocks $204_m$ cannot be removed from the media blocks 202n without invalidating the access to later stored data blocks $204_m$. A data structure used to track the media blocks $202_n$ and data blocks $204_m$ is herein referred as an active window table 112. The active window table 112 is further described with reference to FIGS. 3A–3D. All unused data blocks are monitored in a data structure, e.g., a scratch pool list 113, by the data backup program 110.

The size of the media blocks $202_n$ and data blocks $204_m$ may be variable. One media block $202_n$ may store multiple data blocks. For example, media block A $202_1$ stores data block 1 $204_1$, data block 2 $204_2$ and a portion of data block 3 $204_3$. Also, multiple media blocks $202_n$ may be required to store one data block $204_m$. For example, data block 5 $204_5$ is stored in or is spanned over at least portions of five media blocks D, E, F, G and H, $202_4$ to $202_8$.

To manage the use of the media blocks $202_n$, the operating system 108 assigns an expiration date for each data block $204_m$. The expiration date indicates the length of time a data block $204_m$ is active or usable in the storage medium 116. If an expiration date for the data block $204_m$ has not passed, the data block $204_m$ remains active, e.g., usable by the computer system 100. However, once the expiration data for the data block $204_m$ has passed, the data block is no longer active, i.e., expired. Such an expired data block is usable but has decreased relevance, e.g., stale or untimely information, in the computer system 100. If a media block $202_n$ contains only expired data blocks $204_m$, then the operating system 108 would allocate that particular media block $202_n$ for reuse.

A collection of linearly ordered media blocks $202_n$ is herein referred to as a "media set" 200. If all the media blocks $202_n$ in the media set 200 stores at least a portion of an active data block $204_m$, the media set 200 is a "dynamic media set" 200. The dynamic media set 200 changes if additional media blocks $202_n$ are needed or if media blocks $202_n$ in the media set 200 may be reused. For example, additional media blocks $202_n$ are required to store additional data blocks $204_m$. Additionally, media blocks $202_n$ need to be reused if all the data blocks $204_m$ in the media set 200 become expired, i.e., after the expiration date of all the data blocks $204_m$ in a particular media block $202_n$ has passed. To track the media blocks $202_n$ in a particular media set 200, the operating system 108 assigns a "media header label" $206_n$ for each media block $202_n$. The media header label $206_n$ contains an identifier of the first media block $202_1$ in the media set 200 and the MBSQ number indicative of the position of a particular media block $202_n$ within the media set 200. The first media block $202_1$ in the media set 200 is also referred to as a "reference data block." In the example of FIG. 2, the media set 200 illustratively comprises nine media blocks $202_1$, $202_2$, ..., $202_9$, and first media block $202_1$ is media block A.

Figure 2B:
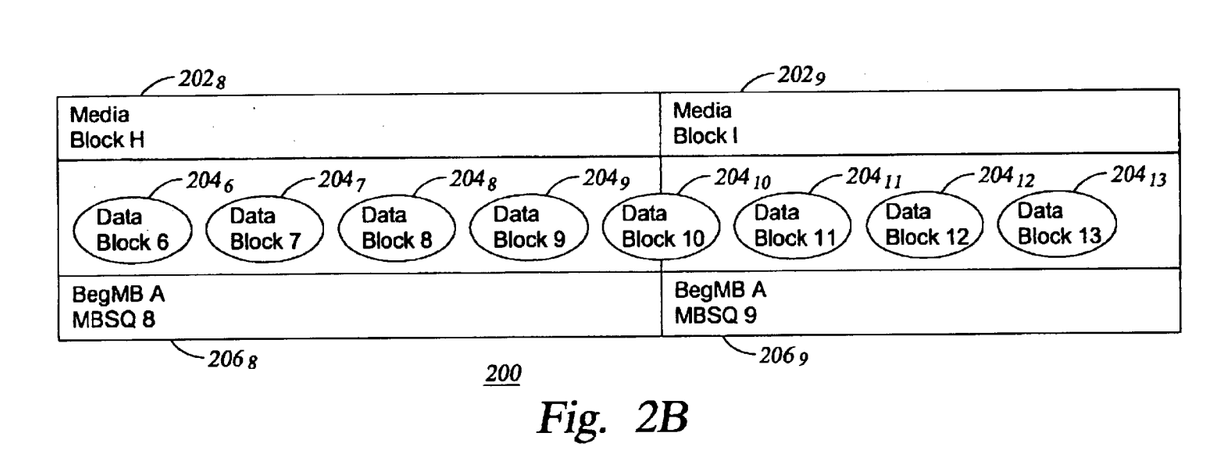
FIG. 2B illustrates the media set of FIG. 2A after expiration of some of data blocks.

FIG. 2B depicts the media set 200 after expiration of some data blocks $204_m$. Illustratively, the first five data blocks $204_1$, $204_2$, $204_3$, $204_4$ and $204_5$ have now expired, i.e., the expiration dates have passed for these blocks $204_1$, $204_2$, $204_3$, $204_4$ and $204_5$. These seven media blocks $202_1$, $202_2$, ..., $202_7$ now contain only expired data blocks $204_m$. To maximize reuse of the storage medium, the operating system 108 must remove these media blocks $202_1$, $202_2$, ..., $202_7$ from the media set 200. However, if media blocks $202_1$, $202_2$, ..., $202_7$ are removed from the media set 200 and allocated for reuse, the other media header label $206_8$ and $206_9$ information is no longer accurate for the updated media set 200 comprising media blocks $202_8$ and $202_9$. Namely, the media header labels $206_8$ and $206_9$ no longer accurately describe the media set 200, since the media header labels $206_8$ and $206_9$ now point or reference a media block $202_1$ that is no longer part of the media set 200. Moreover, alteration of the media header labels $206_8$ and $206_9$ is impossible without destroying everything else, e.g., data blocks $204_6$ to $204_{13}$, in the media blocks $202_8$ and $202_9$.

The use of incorrect media header labels $206_n$ may cause problems for the operating system 108 in tracking the media set 200. If the first media block $202_1$ of the original media set 200 is reused in the beginning of another media set 200, then the first media block $202_1$ is referenced in two separate media sets 200. The operating system 108 would then have problems differentiating between various media blocks $202_n$ in the two media sets 200. If the first media block $202_1$ is reused in the original media set 200 to store additional data, then the reused media block $202_1$ would be erroneously referenced as it is no longer the reference media block $202_n$.

To eliminate the problems in reusing media blocks $202_n$ in the operating system 108, the active window 112 is used to manage the media blocks $202_n$ in the media set 200. The active window 112 for the example of FIG. 2B is further described with respect to FIG. 3B.

Figure 2C:
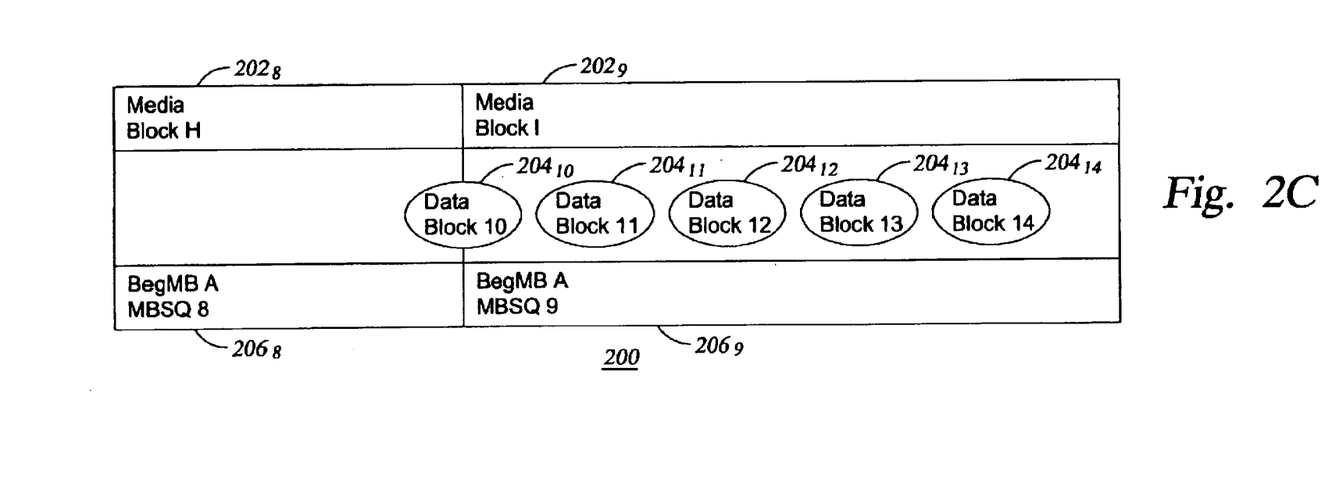
FIG. 2C illustrates the media set of FIG. 2B after storing additional data blocks.

FIG. 2C depicts the media set 200 after storing an additional data block $204_{14}$. To maximize the use of storage medium 116, any available storage memory in the last media block $202_9$ is used to store any additional data blocks $204_{14}$. If additional storage memory is required to store additional media blocks $202_n$, then additional media blocks $202_n$ are retrieved from available storage memory identified in the scratch pool 113.

Figure 2D:
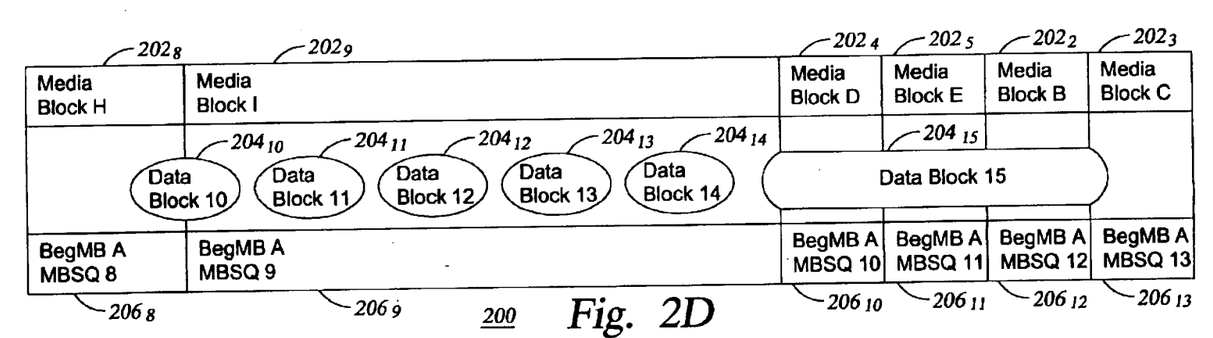
FIG. 2D illustrates the media set of FIG. 2C after reusing available media blocks on a scratch pool list.

FIG. 2D depicts the media set 200 having additional media blocks $202_n$ to store additional data blocks $204_m$. Illustratively, additional memory is required to store an additional data block $204_{15}$. The additional memory to store the new data block $204_{15}$ is retrieved from available storage memory identified in the scratch pool list 113. Illustratively, previously used media blocks $202_2$, $202_3$, $202_4$ and $202_5$ are retrieved from the scratch pool 113 and reused to store the new data block $204_{15}$.

Figure 3A:
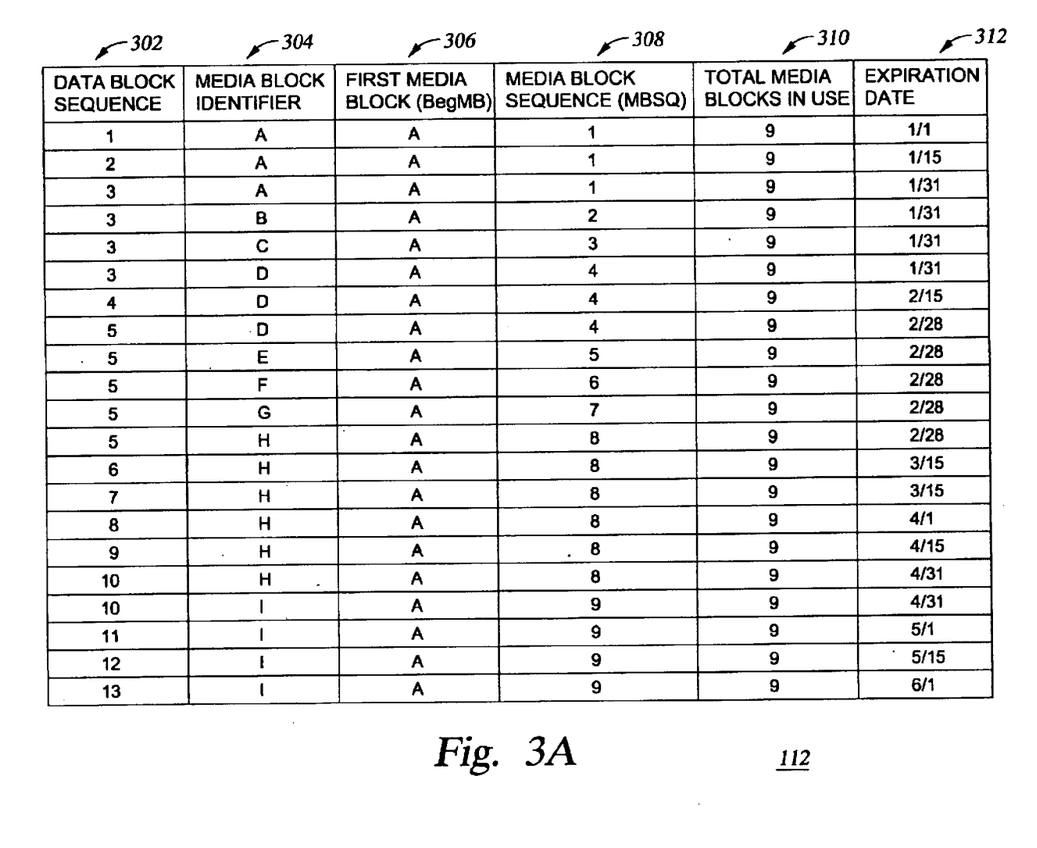
FIG. 3A depicts an active window table used for tracking the storage medium of FIG. 2A.

FIG. 3A depicts the active window table 112 used for tracking the media set 200 of FIG. 2A. The active window table 112 is a data structure that maintains information on the dynamic media set 200. As described above, the dynamic media set 200 is a set of media blocks $202_n$ that stores currently active data blocks $204_m$. Thus, the dynamic media set 200 changes if data blocks $204_m$ become expired or if additional data blocks $204_m$ are stored in a particular media set 200. In one embodiment, each entry or row in the active window table 112 represents a unique data block $204_m$ and media block $202_n$ combination. For example, media block A $202_1$ stores two data blocks $204_1$ and $204_2$ and a portion of a third data block $204_3$. The active window table 112 illustratively contains separate entries for each different data block $204_m$ in the media block $202_1$.

The active window table 112 contains a plurality of fields that contain information for each entry or row. In one embodiment, the active window table 112 comprises a data block sequence identifier 302, a media block identifier 304, a first media block (BegMB) identifier 306, a media block sequence (MBSQ) identifier 308, total media blocks identifier 310 and an expiration date identifier 312.

The data block sequence identifier 302 comprises a position of a particular data block $204_m$ in the linearly ordered sequence of data blocks $204_m$ in the dynamic media set 200. The media block identifier 304 comprises an identifier or name of a particular media block $202_n$. The first media block identifier 306 comprises the identifier of the first or oldest media block $202_n$ or reference media block currently in the media set 200. In contrast to the media header label $206_n$, the first media block identifier 306 contains the identifier of the media block $202_n$ that is the first in the media set 200, i.e., the reference media block. As such, the use of the active window table 112 instead of the media header label $206_n$ enables the data backup program 110 to properly track the reference media block and manage the reuse of media blocks $202_n$ in the storage medium 116.

The MBSQ identifier 308 comprises a position of a particular media block $202_n$ in the linearly ordered sequence of media blocks $202_n$. The total media blocks identifier 312 comprises the total number of media blocks $202_n$ in a dynamic media set 200. The value of the identifier 312 changes as media blocks $202_n$ are added and removed from the media set 200. The expiration date identifier 312 comprises the expiration date of a particular data block $204_m$. The identifier 312 is used to update the media set 200. More specifically, if all the data blocks $204_m$ within a particular media block $202_n$ has expired, then the media block $202_n$ is removed from the media set 200 and the active window table 112.

Figure 3B:
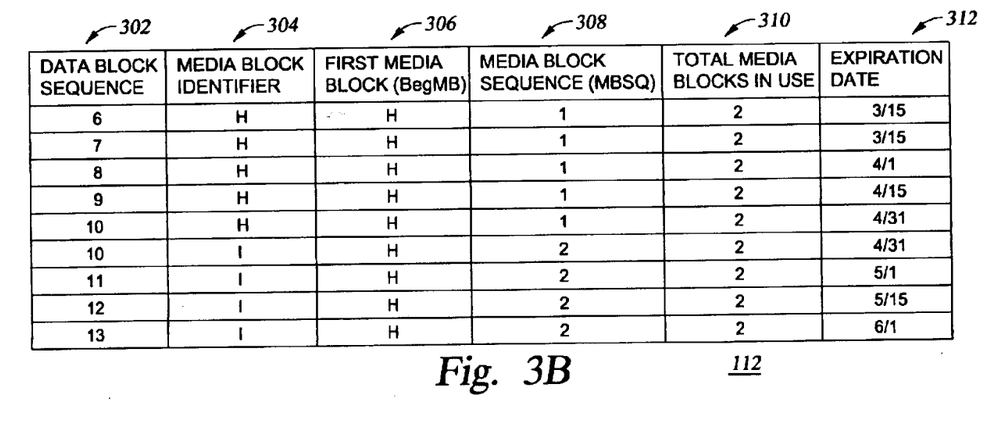
FIG. 3B depicts the active window table for the media set of FIG. 2B.

FIG. 3B depicts the active window table 112 for the media set 200 of FIG. 2B. The data backup program 110 updates the active window table 112 to reflect the current status of the dynamic media set 200. In the example of FIG. 2B, the first five data blocks $202_1$, $202_2$, ..., $202_5$ have expired. This occurs after the expiration dates of these data blocks $202_1$, $202_2$, ..., $202_5$ have passed, e.g., on March 14. If the expiration date identifier 314 is passed, then the corresponding row or entry is removed from active window 112. The remaining entries in the active window table 112 are updated to indicate that the first seven media blocks $202_1$, ..., $202_7$ are no longer part of the media set 200. If a particular media blocks $202_n$ contains only expired data blocks, the media block $202_n$ is placed in the scratch pool list 113 for future reuse.

In contrast to the media header labels $206_8$ and $206_9$, the first media block identifier 308 is updated to contain the media block identifier 306 of the oldest remaining media block $202_8$ or reference data block in the media set 200. In one embodiment, all media blocks $202_n$ in the media set 200 have the same value for the BegMB identifier 306. The data backup program 110 uses information in the first media block identifier 306 to manage the allocation and reuse of media blocks $202_n$ of the storage medium 116. In addition to the first media block identifier 306 field, the data block sequence identifier 302, the media block sequence identifier 308, and the total media block identifier 310 are also updated.

Figure 3C:
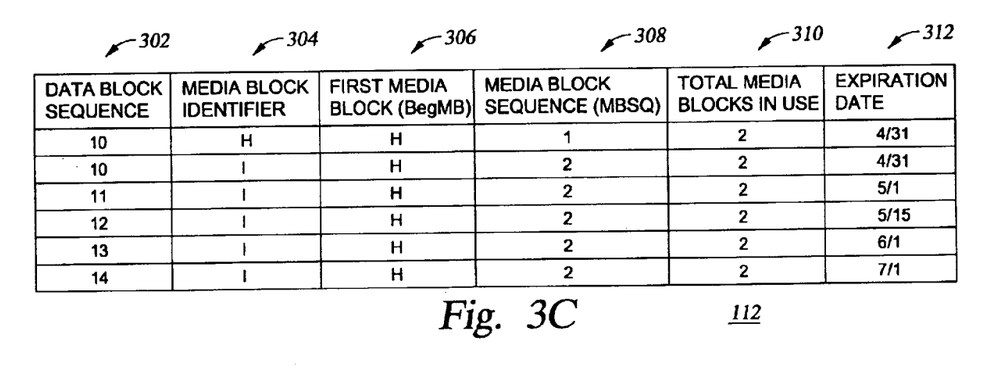
FIG. 3C depicts the active window table for the media set of FIG. 2C.

FIG. 3C depicts the active window table 112 for the media set 200 of FIG. 2C. Specifically, the data backup program 110 updates the active window table 112 to contain information for the most recently added data block $204_{14}$. Additionally, the active window table 112 is updated in response to the expiration of other data blocks $204_6$, $204_7$, $204_8$ and $204_9$ in media block H $202_8$, e.g., the date is now April, 20. Note that the media set 200 still contains an active data block $204_{10}$. Although the expired data blocks $204_6$, $204_7$, $204_8$ and $204_9$ are no longer part of the active window table 112, these data blocks $204_m$ may remain in the media block $202_8$ until the expiration of the last data block $204_{10}$ in the media block $202_8$.

Figure 3D:
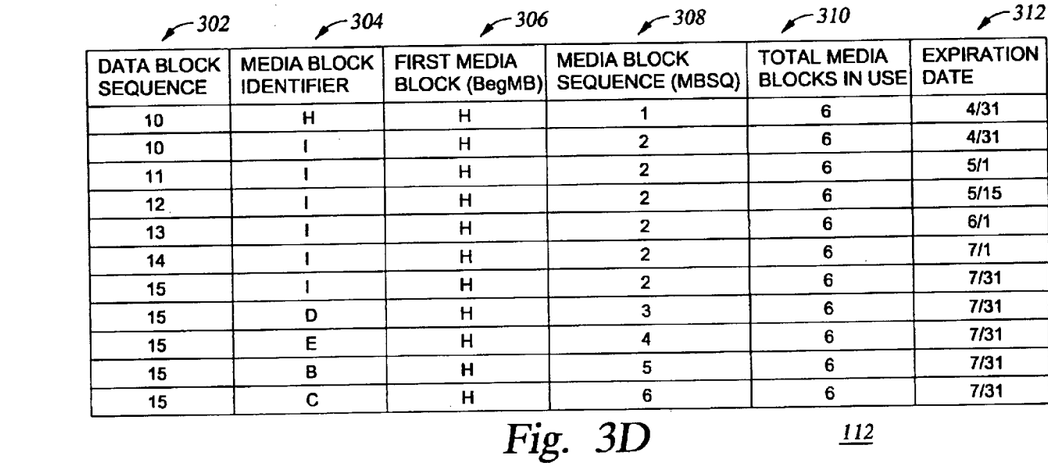
FIG. 3D depicts the active window table for the media set of FIG. 2D.

FIG. 3D depicts the active window table 112 for the media set 200 of FIG. 2D. To store the additional data block $204_{15}$, the remaining storage memory in media block I $202_9$ is used as well as additional media blocks $202_2$, $202_3$, $202_4$ and $202_5$ from the scratch pool 112. The updated active window 112 illustratively has five additional entries, i.e., one entry for each media block $202_n$ used to store the additional data block $204_{15}$.

Figure 4:
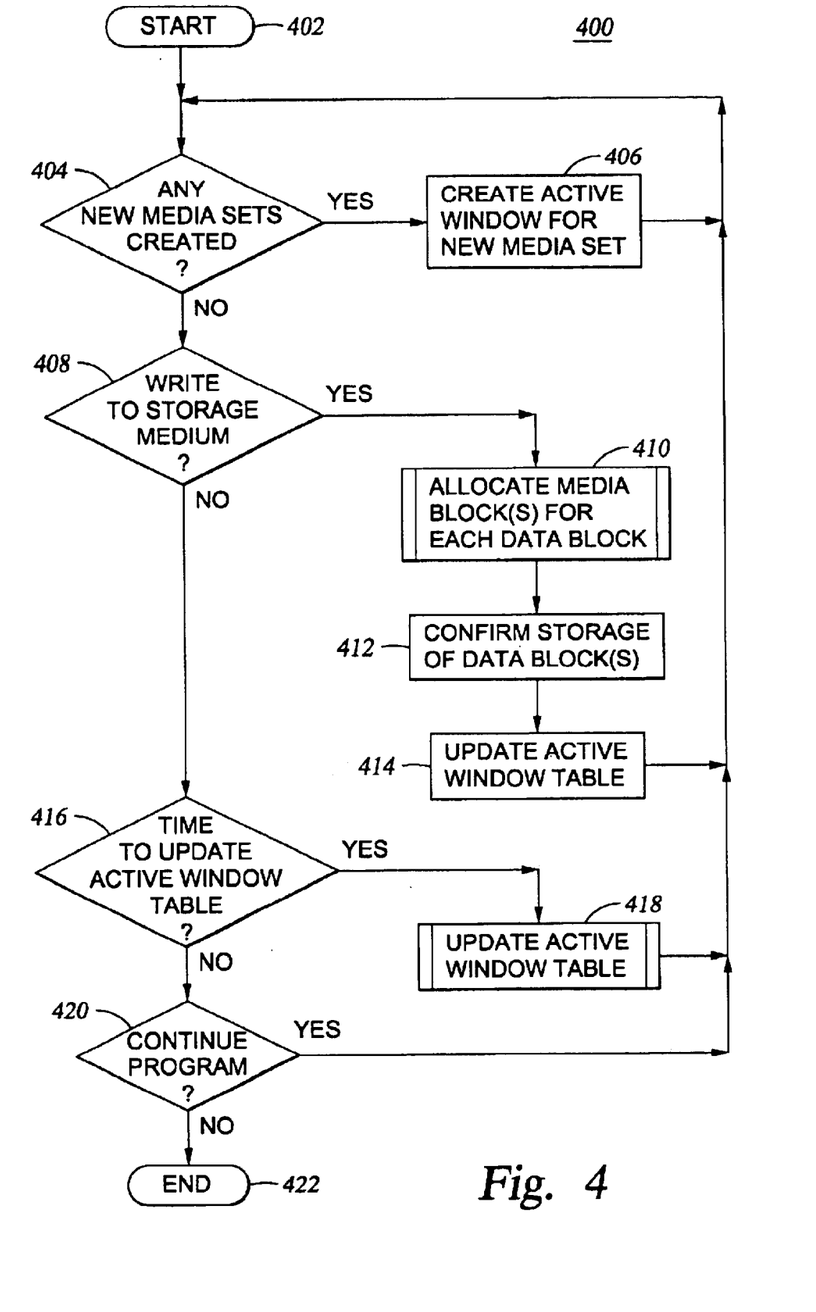
FIG. 4 depicts a flow chart of a method to implement the data backup program.

FIG. 4 depicts a flow chart of a method 400 to implement the data backup program 110. In one embodiment, the method 400 is implemented in the data backup program 110 in combination with the operating system 108. The method 400 updates an active window table 112 used to track the dynamic media set 200 comprising of media blocks $202_n$ containing active or non-expired data blocks $204_m$. By tracking the dynamic media sets 200, the method 400 manages the allocation of storage memory in the reusable storage medium 116.

In current implementations, the operating system 108 cannot modify information in the media header label $206_n$ without invalidating the entire media set 200. The use of the active window table 112 to manage media sets 200 of reusable media blocks $202_n$ enables the program 110 and the operating system 108 to efficiently use the storage medium 116. Media blocks $202_n$ no longer containing active data blocks $204_m$ are marked for reuse. Otherwise, reuse of memory in an existing media set 200 is not possible until all data blocks $204_m$ in all media blocks $202_n$ of the media set 200 have expired.

Specifically, the method 400 starts at step 402 and proceeds to step 404 where a query determines whether any new media sets 200 have been created. In one embodiment, the media sets 200 in the storage medium 116 are created by the operating system 108. If new media sets 200 have been created, the method 400 proceeds to create an active window table 112 for each new media set 200 and returns to step 404. If no new media sets 200 have been created, the method 400 proceeds to step 408, where a query determines whether there is a request to write to the storage medium 116. If there is no request to write to the storage medium 116, the method proceeds to step 416.

If there is a request to write to the storage medium 116, the method 400 proceeds to step 410 where media block(s) $202_n$ are allocated for each data block $204_m$ to be stored. Step 410 is further described with respect to FIG. 5. After allocating media blocks $202_n$ at step 410, the method 400 proceeds to confirm storage of the data blocks $204_m$ at step 412, updates the active window table 112 at step 414 and returns to step 404. Step 414 adds entries for the new data blocks $204_m$. An example of storing data blocks $204_m$ to an existing media set 200 was described with reference to FIG. 2C. An example of an active window table 112 tracking these changes was described with reference to FIG. 3C.

At step 416, a query determines whether it is time to update the active window table 112. In one embodiment, such an update is performed periodically, e.g., every 24 hours. If the active window table 112 is to be updated, the method 400 proceeds to update the active window table at step 418 and returns to step 404. Step 418 is further described with respect to FIG. 6. If the active window table 112 is not to be updated, the method 400 proceeds to step 420. At step 420, a query determines whether the program 110 should continue. If the program 110 should continue, the method 400 returns to step 404. If the program 110 should end, the method 400 exits at step 422.

Figure 5:
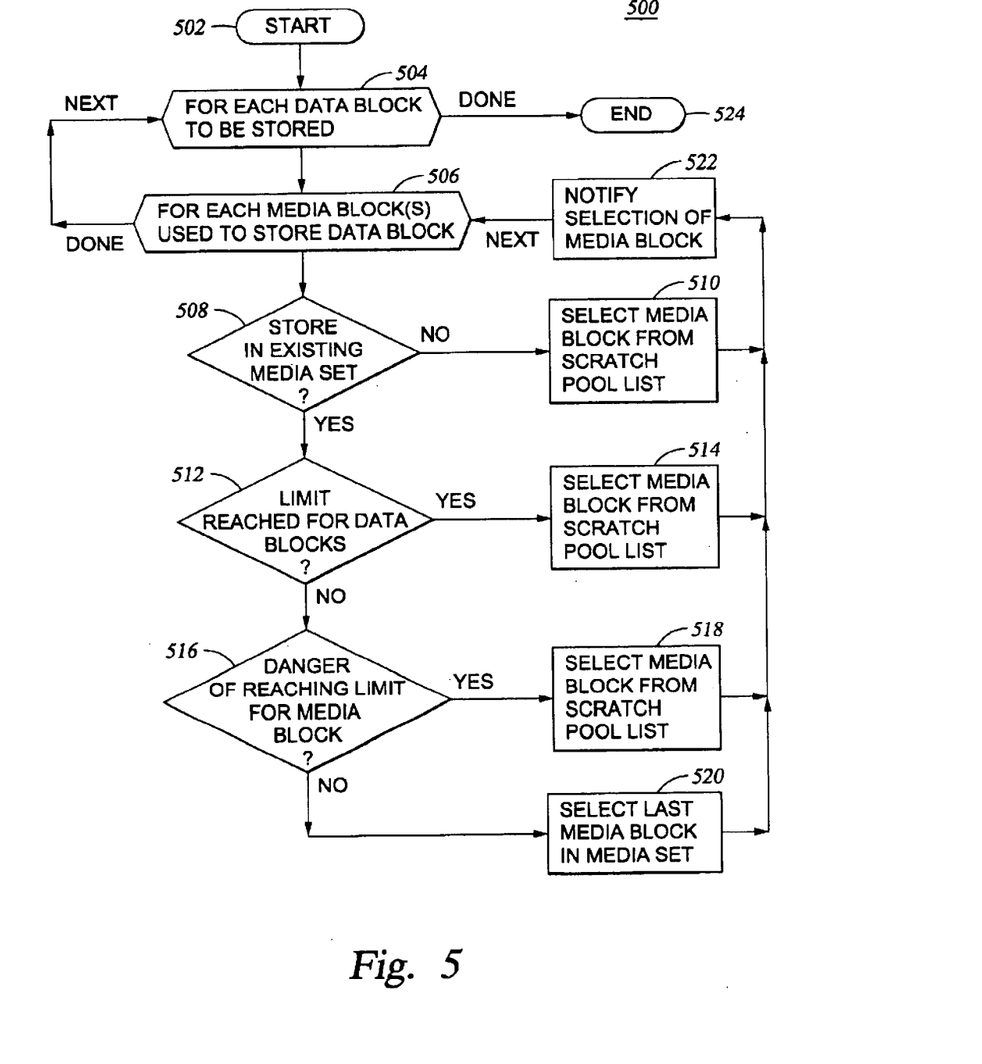
FIG. 5 depicts a flow chart of a method to allocate media blocks for storing data blocks.

FIG. 5 depicts a flow chart of a method 500 to allocate media blocks $202_n$ for storing data blocks $204_m$. The method 500 is embodied as step 410 described above with reference to FIG. 4. An example of allocating media blocks $202_n$ to store additional data blocks $204_m$ was described with reference to FIG. 2D. An example of an active window table 112 tracking these changes was described with reference to FIG. 3D. Specifically, the method 500 starts at step 502 and proceeds to step 504 to process each data block $204_m$ to be stored. The method 500 proceeds to step 506 where each media block(s) $202_n$ used to store a particular data block $204_m$ is processed. In processing each media block $202_n$, the method 500 proceeds to step 508 where a query determines whether to store a particular data block $204_m$ in an existing media set 200. If the data block $204_m$ is not to be stored in an existing media set 200, the method 500 proceeds to select a media block $202_n$ from the scratch pool list 113 at step 510 and then to step 522.

If the data block $204_m$ is to be stored in an existing media set 200, the method 500 proceeds to step 512, where a query determines whether a limit of data blocks $204_m$ is reached. The limit represents a maximum possible number of data blocks $204_m$ in the media set 200. The value of this limit is also constrained by the operating system 108. For a 32-bit processor 102, an exemplary value is two to the thirty-second power or approximately 16.7 million. If the limit is reached, the method 500 proceeds to select a media block $202_n$ from the scratch pool list 113 at step 514 and then proceeds to step 522. If the limit is not reached, the method 500 proceeds to step 516

At step 516, a query determines whether a limit of media blocks $202_n$ is in danger of being reached. The limit represents a maximum possible number of media blocks $204_m$ in the media set 200. The value of the limit is constrained by the operating system 108. For example, if the exemplary limit is 9999, then step 516 may anticipate the limit at 9000 media blocks $202_n$. If the limit is in danger of being reached, the method 500 proceeds to select a media block $202_n$ from the scratch pool list 113 at step 518 and proceeds to step 522. If the limit is not in danger of being reached, the method 500 proceeds to step 520 where the last media block $202_n$ in the media set 200 is selected. After this step 520, the method 500 proceeds to step 522.

At step 522, the method 500 notifies the selection of the media block 202n from steps 510, 514, 518 and 520 to the operating system 108. The operating system 108 would then allocate the media block $202_n$ for storage of the particular media block $202_n$ being considered. Once all the media blocks $202_n$ are processed for a particular data block $204_m$ at step 506, the method 500 proceeds back to step 504 where the next data block $204_m$ is processed. After processing all the data blocks $204_m$ to be stored at step 504, the method 500 ends at step 524.

Figure 6:
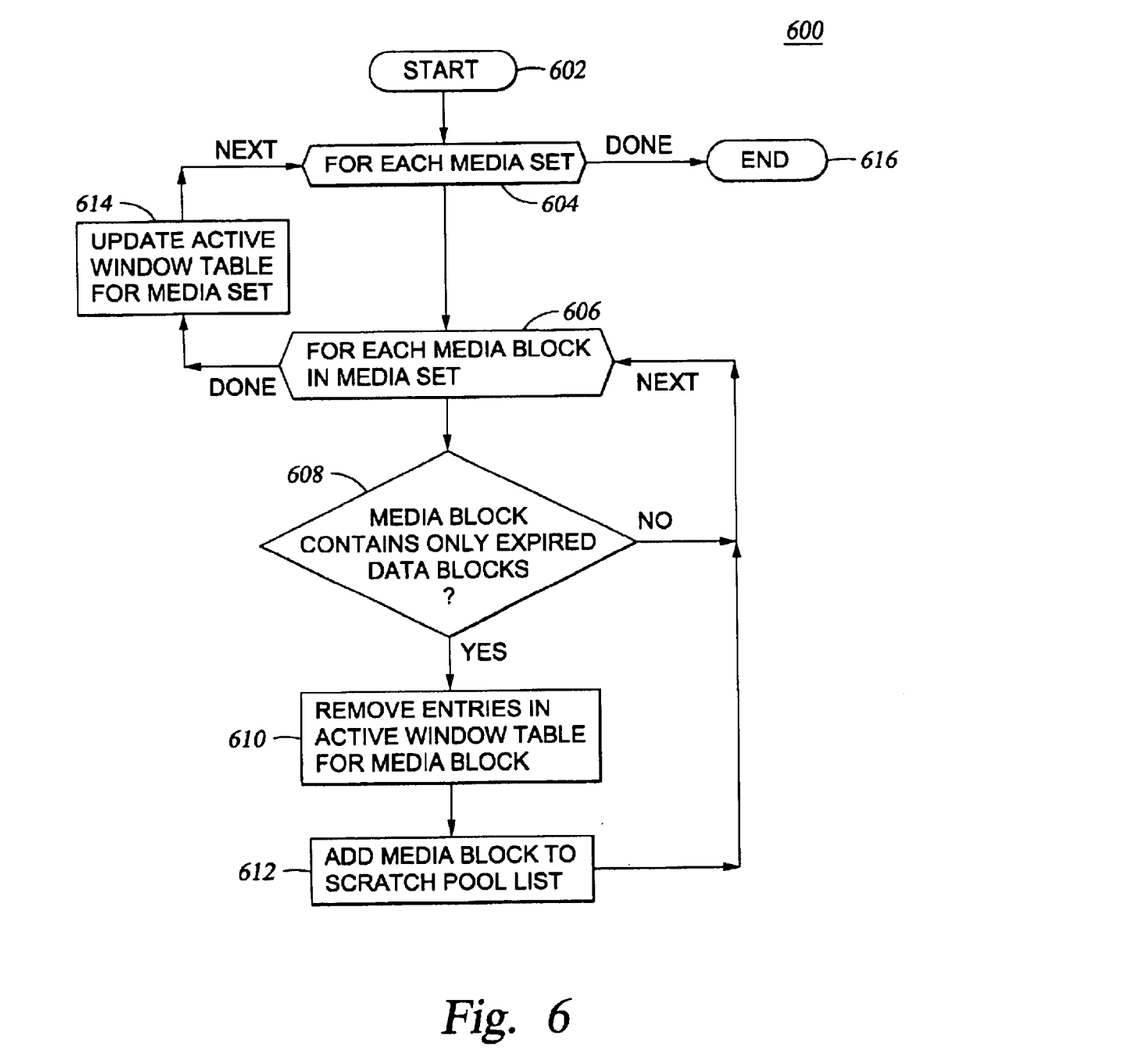
FIG. 6 depicts a flow chart of a method to update an active window table.

FIG. 6 depicts a flow chart of a method 600 to update an active window table 112. The method 600 is embodied as step 418 described above with reference to FIG. 4. The method 600 updates the active window table 112 to account for data blocks $204_m$ that have expired. An example of an updated media set 200 to account for expired data blocks $204_m$ was described with reference to FIG. 2B. An example of an active window table 112 tracking these changes was described with reference to FIG. 3B. Specifically, the method 600 starts at step 602 and proceeds to process each media set 200 at step 604. The method 600 then proceeds to step 606 where each media block $202_n$ in a particular media set 200 is processed. In one embodiment, step 606 processes all media block sequence identifiers 306 in the active window table 112.

At step 608, a query determines whether the media block $202_n$ contains only expired data blocks $204_m$. Namely, step 608 determines whether to remove the media block $202_n$ from the active window table 112 to the scratch pool 113. If the media block $202_n$ contains at least a portion of an active data block $204_m$, i.e., does not only contain expired data blocks $204_m$, the method 600 proceeds to process the next media block $202_n$ at step 606. If the media block $202_n$ contains only expired data blocks $204_m$, the method 600 proceeds to step 610 where entries in the active window table 112 are removed for the media block $202_n$. The method 600 then proceeds to add the media block $202_n$ to the scratch pool list 113 at step 612 and returns to process the next media block $202_n$ at step 606.

Once all the media blocks $202_n$ in the media set 200 are processed, the method 400 proceeds to step 614 where the active window table 112 is updated to remove entries for expired data blocks $204_m$. The method 400 then proceeds to the next media set 200 at step 604. Once all the media sets 200 are processed, the method 600 proceeds to end at step 616.

Although various embodiments which incorporate the teachings of the present invention have been shown and described in detail herein, those skilled in the art can readily devise many other varied embodiments that still incorporate these teachings.

What is claimed is:

1. A method for managing a reusable linear access storage medium having a plurality of linearly ordered media blocks, where a media block is included in a media set if the media block is used to store at least a portion of one or more linearly ordered data blocks, the method comprising:

creating an active window table to monitor the at least one media block in the media set, the active window table containing a list of media blocks in the media set, an identification of data blocks stored in the listed media blocks, information regarding expiration of data blocks stored in the listed media blocks, and an indication, separate from the expiration information, of a reference media block that is the oldest media block in the list;

identifying any media blocks listed in the active window table that store only data blocks that have become expired, based on the information contained in the active window table;

removing any identified media blocks from the active window table;

determining whether any of the identified media blocks is a reference media block; and updating, if any of the identified media blocks removed is determined to be a reference media block, the active window table to indicate a different media block as a reference media block that is the oldest media block of the remaining media blocks listed in the active window table.

2. The method of claim 1, further comprising:

adding any identified media blocks to a scratch pool list for future reuse of identified media blocks.

3. The method of claim 2, wherein the active window table is a data structure created and updated by a data backup program used with an operating system in a computer system.

4. The method of claim 1, wherein the identifying, determining, removing and updating are repeated to manage the storage medium.

5. The method of claim 1, wherein a data block expires if an expiration date for the data block has been passed.

6. The method of claim 1, wherein the motive window table comprises at least one of a data block sequence identifier, a media block identifier, a reference block identifier, a media block sequence identifier, and an expiration date identifier.

7. The method of claim 6, further comprising:

updating the media block sequence identifier for each media block in the media set, where the media block sequence identifier indicates the sequential order of the media block used to store at least a portion of one data block in the reusable storage medium.

8. The method of claim 1, further comprising:

determining whether an additional data block can be stored in a most recent media block in the media set.

9. The method of claim 8, further comprising:

storing, if the additional data block can be stored in the most recent media block in the first set, the additional data block in the most recent media block.

10. The method of claim 8, further comprising:

selecting, if an available storage memory in the most recent media block is insufficient to store the additional data block, an additional media block from a scratch pool list;

confirming an allocation of the selected media block; and storing the additional data block in the allocated media block.

11. An apparatus for managing a linear access reusable storage medium having a plurality of linearly ordered media blocks, where a particular media block is included in a media set if the media block is used to store at least a portion of one linearly ordered data block, the apparatus comprising:

a memory for storing a data backup program, an active window table, and an operating system, wherein the active window table contains a list of media blocks, information regarding expiration of data blocks stored in the media blocks, and indication, separate from the expiration information, of a reference media block that is the oldest media block in the list;

a processor for performing a method upon executing the data backup program with the operating system, the method comprising:

identifying, based on the expiration information, any media blocks in the active window table that store only data blocks that have become expired;

removing any identified media blocks from the active window table;

determining whether any of the identified media blocks is a reference media block; and updating, if any of the identified media blocks removed is determined to be a reference media block, the active window table to indicate a different media block as a reference media block.

12. The apparatus of claim 11 wherein the method further comprises:

adding any identified media blocks to a scratch pool list for future reuse of identified media blocks.

13. The apparatus of claim 11 wherein the identifying, determining, removing and updating are repeated to manage the storage medium.

14. The apparatus of claim 11 wherein the active window table comprises at least one of a data block sequence identifier, a media block identifier, a reference block identifier, a media block sequence identifier, and an expiration date identifier.

15. The apparatus of claim 14 wherein the method further comprises:

updating the media block sequence identifier for each media block in the media set, where the media block sequence identifier indicates the sequential order of the media block used to store at least a portion of one data block in the reusable storage medium.

16. A computer readable medium storing a software program that, when executed by a computer, causes the computer to perform a method for managing a linear access reusable storage medium having a plurality of linearly ordered media blocks, where a particular media block is included in a media set if the media block is used to store at least a portion of one linearly ordered data block, the method comprising:

creating an active window table to monitor the at least one media block in the media set, the active window table containing a list of media blocks in the media set, an identification of data blocks stored in the listed media blocks, information regarding expiration of data blocks stored in the listed media blocks, and an indication, separate from the expiration information, of a reference media block that is the oldest media block in the list;

identifying any media blocks in the active window table that store only data blocks that have become expired, based on the information contained in the active window table;

removing any identified media blocks from the active window table;

determining whether any of the identified media blocks is a reference media block; and updating, if any of the identified media blocks removed is determined to be a reference media block, the active window table to indicate a different media block as a reference media block.

17. The computer readable medium of claim 16 wherein the method further comprises:

adding any identified media blocks to a scratch pool list for future reuse of identified media blocks.

18. The computer readable medium of claim 17 wherein the active window table is a data structure created and updated by a data backup program used with an operating system in a computer system.

19. The computer readable medium of claim 16 wherein the identifying, determining, removing and updating are repeated to manage the storage medium.

20. The computer readable medium of claim 16 wherein a data block expires if an expiration date for the data block has been passed.

21. The computer readable medium of claim 16 wherein the active window table comprises at least one of a data block sequence identifier, a media block identifier, a reference block identifier, a media block sequence identifier, and an expiration date identifier.

22. The computer readable medium of claim 21 wherein the method further comprises:

updating the media block sequence identifier for each media block in the media set, where the media block sequence identifier indicates the sequential order of the media block used to store at least a portion of one data block in the reusable storage medium.

23. The computer readable medium of claim 16 wherein the method further comprises:

determining whether an additional data block can be stored in a most recent media block in the media set.

24. The computer readable medium of claim 23 wherein the method further comprises:

storing, if the additional data block can be stored in the most recent media block in the first set, the additional data block in the most recent media block.

25. The computer readable medium of claim 23 wherein the method further comprises:

selecting, if an available storage memory in the most recent media block is insufficient to store the additional data block, an additional media block from a scratch pool list;

confirming an allocation of the selected media block; and storing the additional data block in the allocated media block.

* * * * *